United States Patent [19]

Chang

[11] Patent Number: 4,608,187
[45] Date of Patent: Aug. 26, 1986

[54] RUBBER TOUGHENED POLYVINYL ALCOHOL FILM COMPOSITIONS

[75] Inventor: Daniel M. Chang, Pleasanton, Calif.

[73] Assignee: The Clorox Company, Oakland, Calif.

[21] Appl. No.: 595,980

[22] Filed: Apr. 2, 1984

[51] Int. Cl.$^4$ .................................. C11D 17/00
[52] U.S. Cl. ........................... 252/90; 252/174; 206/524.7
[58] Field of Search ............... 252/90, 174; 206/524.6, 206/524.7; 525/56

[56] References Cited

U.S. PATENT DOCUMENTS

| | | |
|---|---|---|
| 2,804,395 | 8/1957 | Boyajian . |
| 3,113,674 | 12/1963 | Kiefer et al. . |
| 3,148,166 | 9/1964 | Suzumra et al. . |
| 3,198,740 | 8/1965 | Dunlop et al. . |
| 3,220,991 | 11/1965 | Martins . |
| 3,300,546 | 1/1967 | Baechtold . |
| 3,316,190 | 4/1967 | Suzumura et al. . |
| 3,366,592 | 1/1968 | Beeman . |
| 3,374,195 | 3/1968 | Bianco et al. . |
| 3,409,598 | 11/1968 | Takigawa et al. . |
| 3,413,229 | 11/1968 | Bianco et al. . |
| 3,505,303 | 4/1970 | Lindermann . |
| 3,528,921 | 9/1970 | Gray . |
| 3,607,812 | 9/1971 | Takigawa et al. . |
| 3,632,786 | 1/1972 | Nickerson . |
| 3,892,905 | 7/1975 | Albert . |
| 4,082,678 | 4/1978 | Pracht et al. . |
| 4,115,292 | 9/1978 | Richardson et al. . |
| 4,155,971 | 5/1979 | Wysong . |
| 4,188,304 | 2/1980 | Clarke et al. ............ 252/90 |
| 4,289,815 | 9/1981 | Lee . |
| 4,348,293 | 9/1982 | Clarke et al. ............ 252/90 |
| 4,374,035 | 2/1983 | Bassu ........................ 252/90 |
| 4,410,441 | 10/1983 | Davies et al. ............ 252/90 |
| 4,416,791 | 11/1983 | Hag .......................... 252/90 |

FOREIGN PATENT DOCUMENTS

| | | |
|---|---|---|
| 11502 | 5/1980 | European Pat. Off. . |
| 87542 | 7/1976 | Japan . |
| 2090603 | 7/1982 | United Kingdom . |

OTHER PUBLICATIONS

*Principles of Polymerization*, Odian, pp. 28–33, (1970).
*Introduction to Polymer Chemistry*, Seymour, pp. 15–22, (1971).
*Chemical Abstracts*, p. 35, No. 96810q, vol. 80, 1974, "Paper Diaper Cover Film Soluble in Warm Water".
Bucknall, C. B., "Fracture Phenomena in Polymer Blends", in *Polymer Blends*, vol. 2, Chap. 14, (Academic Press, 1978).
Newman, S., "Rubber Modification of Plastics", in *Polymer Blends*, vol. 2, Chap. 13, (Academic Press, 1978).
Platzer, N., "Chemistry and Technology of Multicomponent Polymer Systems", in *Applied Polymer Science*, Chap. 4, Craver & Tess, Eds., ACS, Organic Coatings and Plastics Chemistry, (1975).

*Primary Examiner*—Josephine L. Barr
*Attorney, Agent, or Firm*—Majestic, Gallagher, Parsons & Siebert

[57] ABSTRACT

Polymer compositions are provided which may be cast as thin, self-supporting films, useful in forming sealed envelopes or pouches containing granulated pulverulent or non-aqueous liquid materials. The cast films comprise a polymeric matrix, having at least about 50 weight percent polyvinyl alcohol, and a plurality of microdomains dispersed throughout the polymeric matrix. The films have good resistance to breakage at low temperatures and low relative humidities.

19 Claims, 2 Drawing Figures

RUBBER TOUGHENED POLYVINYL ALCOHOL FILM COMPOSITIONS

FIELD OF THE INVENTION

The present invention relates generally to polyvinyl alcohol compositions useful for making packaging films and the like, and more particularly to polyvinyl alcohol compositions with rubbery microdomains therein having improved tensile strength and impact resistance when formed into films.

BACKGROUND ART

Polyvinyl alcohol compositions are known and useful for a variety of applications. For example, polyvinyl alcohol films are used in packaging materials, such as granulated laundry detergent and pulverulent pesticides and insecticides. Packages prepared from these films separate the contents from exposure to the immediate surroundings and provide premeasured amounts of the packaged materials.

Polyvinyl alcohol compositions are water soluble, and rapidly dissolve in hot water. Thus, packages with materials designed for being slurried, dispensed or dissolved in water may be conveniently added to hot water, such as to the wash water of a washing machine when the package contains a laundry aid. As the package dissolves, the contents are dispensed.

However, polyvinyl alcohol films are brittle at low temperatures and low relative humidities. They have thus not found wide commercial use as soluble films in packaging consumer products which may be stored under conditions conducive to package breakage prior to use.

U.S. Pat. No. 4,115,292, inventors Richardson et al., issued Sept. 19, 1978, discloses packets of detergent compositions in polyvinyl alcohol films which are useful in automatic dishwashers. U.S. Pat. Nos. 3,892,905, inventor Albert, issued July 1, 1975 and 4,155,971, inventor Wysong, issued May 22, 1979, both disclose polyvinyl alcohol film-forming compositions which dissolve in cold water. The former compositions are made from a polymer mixture of polyvinyl alcohol or polyvinyl pyrrolidone and a watersoluble plasticizer such as glycerol or polyethylene glycol. The latter discloses polyvinyl alcohol compositions including polyethylene glycol plasticizers which are said to impart enhanced resistance to package breakage.

U.K. patent application No. 2,090,603A, published July 14, 1982, inventor Sonenstein, discloses water soluble films comprising a uniform or homogeneous blend of water soluble polyvinyl alcohol and polyacrylic acid. The compositions are said to have high rates of solubility in both cold and hot water and to be of reduced sensitivity to humidity.

Nevertheless, the known water-soluble polyvinyl alcohol films useful as packaging or delivery pouches have continued to present problems of brittleness at low temperatures and low relative humidities.

SUMMARY OF THE INVENTION

Accordingly, it is an object of the present invention to provide polyvinyl alcohol compositions which may be formed into films having greatly enhanced impact resistance at low temperatures and low relative humidities.

It is another object that the inventive polyvinyl alcohol compositions be suitable for forming water soluble or dispersible films for non-aqueous liquids, such as detergents having substantially no free water, as well as for packaging granulated or pulverulent materials.

In one aspect of this invention, a sealed envelope comprises a self-supporting film which is formed by a polymeric matrix having a plurality of microdomains. The polymeric matrix comprises at least about 50 wt. % polyvinyl alcohol while the microdomains have a glass transition temperature of less than about 0° C. The polymeric matrix is preferably in a weight ratio with respect to the microdomains of between about 32:1 to about 2.3:1.

In another aspect of the present invention, an aqueous polymer composition castable as a thin, self-supporting film comprises a polyvinyl alcohol component and a rubber component. The rubber component is at least partially incompatible with the polyvinyl alcohol component and has a glass transition temperature of less than about 0° C. when cast in film form.

Articles made from compositions in accordance with the present invention are resistant to breakage at low temperature and low relative humidity, and are particularly suitable as packaging or delivery pouches for products such as granulated or non-aqueous, liquid laundry detergents. Articles, made from these films are preferably water soluble, or dispersible, and when containing a laundry aid may be conveniently added to the wash water with the film dissolving and dispensing the article's contents.

BRIEF DESCRIPTION OF THE DRAWINGS

In the photomicrographs.

DETAILED DESCRIPTION OF THE PREFERRED EMBODIMENTS

Polyvinyl alcohol is an excellent film forming material, and has good strength and pliability under most conditions. Polyvinyl alcohol film formation occurs readily by simply evaporating water from the solution.

Commercially available polyvinyl alcohol compositions for casting as films vary in molecular weight and degree of hydrolysis. For most film applications, molecular weights in the range of about 10,000 to about 100,000 are preferred. Hydrolysis is the percent by which acetate groups of the polyvinyl alcohol have been substituted with hydroxyl. For film applications, the range of hydrolysis typically is about 70% up to about 100%. Thus, the term "polyvinyl alcohol" usually includes polyvinyl acetate compounds.

Like other polymeric materials, polyvinyl alcohol can be characterized by glass transition temperature ($T_g$). The glass transition temperature is the temperature at which amorphous domains of a polymer take on characteristic properties of the glassy state—brittleness, stiffness, and rigidity. At temperatures above $T_g$, localized, or segment, movement of the polymer macromolecules occurs and the polymer becomes ductile.

Figure 1:
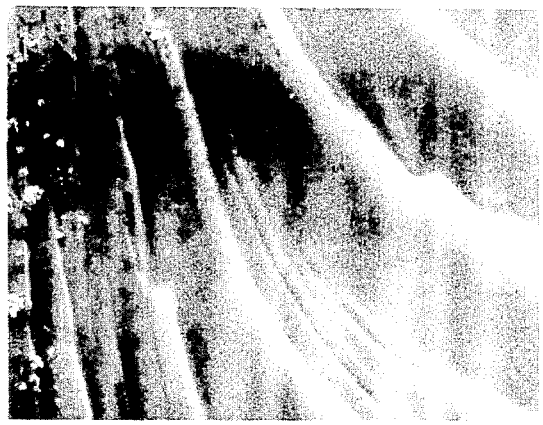
FIG. 1 illustrates a prior art film at a magnification of 1600 times.

Temperature alone does not determine the point at which polyvinyl alcohol becomes brittle, since polyvinyl alcohol readily absorbs water from the atmosphere. The absorbed water acts as a plasticizer, and assists in preventing brittleness. However, at low temperatures and low relative humidity polyvinyl alcohol becomes brittle and has very little impact resistance. Even at 20° C., polyvinyl alcohol becomes brittle when the relative humidity is less than about 15%, and at lower temperatures the situation is exacerbated. FIG. 1 illustrates the photomicrograph taken by a scanning electron microscope of a prior art polyvinyl alcohol film. As may be seen by FIG. 1, the polyvinyl alcohol film has a homogeneous texture and has fractured along a plurality of curves.

A wide variety of materials are known and used as plasticizers for polyvinyl alcohol. For example, ethylene glycol, polyethylene glycol, glycerin and other ether polyols have been known as useful to impart various properties to the films. But plasticizers have not satisfactorily overcome the brittleness problem at low temperatures and relative humidities. And especially after contact with liquids, plasticizer depletion from a polyvinyl alcohol film has been found to present a serious problem.

Broadly, the present invention provides polyvinyl alcohol films which have been toughened by a plurality of discrete, rubbery microdomains. Films in accordance with the invention are resistant to breakage at low temperature and low relative humidity, and may be formed into shapes such as envelopes or pouches (typically having wall thicknesses of from about 0.05 mm to about 0.5 mm) and sealed by means such as heat or pressure after moistening.

Figure 2:
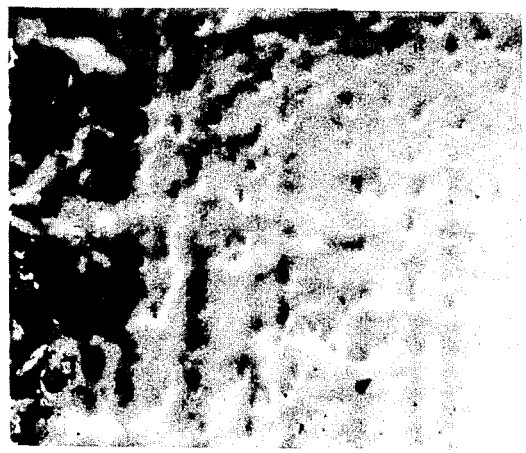
FIG. 2 illustrates a film in accordance with the present invention at a magnification of 1600 times

FIG. 2 illustrates a film in accordance with the present invention. As may be seen, there are a plurality of microdomains, or phase separated, heterogeneous areas, dispersed throughout the polyvinyl matrix, by contrast to the homogeneous, or single phase, of the prior polyvinyl alcohol film illustrated by FIG. 1. The scale of both FIGS. 1 and 2 is whereby about 1.5 centimeters represents 10 microns.

The microdomains in accordance with compositions of the invention have a glass transition temperature of less than about 0° C., and more preferably below about −18° C. Thus, even under very cold conditions, the microdomain material is rubbery. The discrete microdomains are of a size less than about 10 microns, more preferably between about 0.5 to about 2 micron, and most preferably about 0.5 to about 1 micron.

Suitable rubbery materials for microdomains in accordance with the present invention include polydimethylsiloxane ($T_g = -123°$ C.), polyethylene ($T_g = -115°$ C.), polyoxymethylene ($T_g = -85°$ C.), natural rubber ($T_g = -73°$ C.), polyisobutylene ($T_g = -73°$ C.), poly(ethylene oxide) ($T_g = -67°$ C.), neoprene ($T_g = -50°$ C.), styrene-butadiene copolymer ($T_g = -48°$ C.), polypropylene ($T_g = -20°$ C.), poly(vinyl fluoride) ($T_g = -20°$ C.), poly(vinylidene chloride) ($T_g = -19°$ C.), and acrylate ($T_g =$ from about $-18°$ C. to about 43° C., depending upon percent acid groups). Preferred rubbery materials are acrylate and styrene-butadiene copolymer.

The rubbery material, or rubber component, will be at least about 3 wt. % of films in accordance with the present invention, more preferably from about 5 wt. % to about 15 wt. %, and most preferably about 5 wt. % to about 10 wt. %.

The microdomains are dispersed in a polymeric matrix comprising at least about 50 wt. % polyvinyl alcohol, more preferably polyvinyl alcohol in an amount of from about 70 wt. % to about 97 wt. %. The polyvinyl alcohol component of the polymeric matrix is preferably in a weight ratio with respect to the plurality of microdomains, or rubber component, of between about 32:1 to about 2.3:1, more preferably between about 19:1 to about 6:1.

Films in accordance with the present invention may be prepared from aqueous polymer compositions comprising a polyvinyl alcohol component and a rubber component. The polyvinyl alcohol component preferably has a molecular weight from about 10,000 to about 100,000, more preferably about 10,000 to about 50,000, and is about 70% to about 100% hydrolyzed. Where the films are desirably water soluble, or dispersible, then hydrolysis is preferably about 80% to about 90%. The rubber component (which forms the discrete microdomains in the film when cast) is at least partially incompatible with the polyvinyl alcohol component.

It is believed that microdomains of the inventive films improve tensile strength and impact resistance, particularly at low temperatures and relative humidities, by permitting microscopic "crazing" of the polymer matrix adjacent the microdomains when the films are subject to deformation.

Aqueous polymer compositions in accordance with the invention may include dispersing agents, such as sorbitol, mannitol, dextran, glycerin, and one or more wetting agents, such as non-ionic surfactants or the like.

Example I, below, illustrates an aqueous polymer composition embodiment of the invention and the formation of a thin, self-supporting film cast therefrom.

EXAMPLE I

The rubber component was provided by Carboset 515 (acrylate polymer having about 8% acid groups before neutralization and a $T_g$ of $-18°$ C., available from B.F. Goodrich). 40 parts of the Carboset 515 were added with vigorous agitation to a solution containing 2.0 parts of concentrated ammonia (for neutralization of acid groups), 0.5 parts of a non-ionic surfactant (Triton X-114 available from Rohm and Haas Co.) and 57.5 parts of demineralized water. The Carboset 515 dissolved in about one hour with pH at 7.7. The resultant rubber component solution was a clear, viscous syrup ($\eta = 4000$ cps at 20 rpm with a number 3 spindle of a Brookfield viscometer).

The polyvinyl alcohol component was provided by an 88% hydrolyzed, 10,000 molecular weight polymer from Aldrich Chemical Co. One part of non-ionic surfactant (Triton X-114) was dissolved in 79 parts of demineralized water and the solution heated to 80° C. with agitation. Twenty parts of the polyvinyl alcohol component were then added slowly in several portions to avoid particle agglomeration. The resultant polyvinyl alcohol solution was a clear, viscous syrup. ($\eta = 600$ cps at 20 rpm, No. 3 spindle of a Brookfield viscometer).

A dispersing solution was prepared by dissolving 50 parts of sorbitol in 50 parts of demineralized water.

Two parts of the dispersing solution, 2.5 parts of the rubber component solution and 40 parts of the polyvinyl alcohol component solution were admixed with gentle stirring to avoid generating bubbles. The admixture (a cloudy emulsion) was then cast as a 2.4 mil thick film on a glass plate and the film dried at about 50° C. or above.

The photomicrograph of FIG. 2 was taken of a film prepared as just-described in Example I. This film embodiment will sometimes hereinafter be referred to as the "Example I embodiment", and is a preferred embodiment.

Films of the invention are typically hazy (due to the phase separation between microdomains and polymeric matrix) and show two sets of glass transition temperatures. One glass transition is attributable to the rubber component, or rubbery phase, and the other to the polyvinyl alcohol component, or polymer phase. The latter typically varies depending upon relative humidity, but is at a significantly higher temperature than the former. For example, differential scanning calorimetry of the Example I embodiment at a heating rate of 5° C. per minute (conducted over a temperature range between −40° C. to 60° C.) and at 40% relative humidity, showed a $T_g$ of between about −31° C. to about −21° C. (attributable to the rubber component, or microdomains), and then another Tg of about 28° C. attributable to the polyvinyl alcohol matrix.

In an analogous manner, other inventive film embodiments were prepared utilizing various rubber components to form the dispersed microdomains. For example, inventive, toughened polyvinyl alcohol films were prepared with another acrylate polymer (Hycar 2600 X 171, having about 4.5% acid groups before neutralization, Tg of −43° C., available from B. F. Goodrich), with a styrene-butadiene copolymer (Goodrite 2505, Tg of −48° C., available from B. F. Goodrich), with isoprene polymer (Hartex 102, Tg of −70° C., available from Firestone Rubber Co.), and with a chloroprene polymer (i.e. neoprene, Tg of −50° C., available from Firestone Rubber Co.).

Resistance to breakage at different temperatures and relative humidities for films in accordance with the present invention are illustrated by Tables I and II, below. The data of both Tables was gathered by testing at least ten samples of the Example I embodiment by dropping a metal dart of a fixed weight from increasing heights until the film being tested ruptured. Films were conditioned at specified R.H. and temperature before being tested, and the impact tests were performed in a constant temperature room. The tested films had a film thickness of 2.1 mil.

TABLE I

| Temp. (°C.) | R.H. | dart wt. (g) | height (cm) for rupture |
|---|---|---|---|
| −17.8 | <20% | 55 | 15.24 |
| 4.4 | 20% | 55 | 15.24 |
| 4.4 | 35% | 120 | 17.78 |
| 23.9 | 50% | >315 | 38.10 |
| 32.2 | 85% | >400 | 38.10 |
| 37.8 | 70% | >315 | 38.10 |

For comparison, polyvinyl alcohol films with a plasticizer (6 wt. % trimethylopropane) but without the rubber component (that is, without microdomains) were also tested under the same sets of temperature and relative humidity conditions as in Table I. At −17.8° C. (R.H. of less than 20%) the comparison films were too brittle to test and at 4.4° C. (R.H. of 20%) the comparison films ruptured when a 55 gram dart impacted the films after falling from a height of about 10 centimeters. That is, the inventive films demonstrated significantly improved impact resistance at low temperatures and low relative humidities with respect to the comparison, polyvinyl alcohol films. The impact resistances of both the inventive films and the comparison films were similar at temperatures at and above about 23.9° C. (75° F.) and R.H. of 50% or higher.

Table II, below, illustrates data from tests similar to those illustrated by Table I, but with the difference that the inventive films were exposed for 12 days to a liquid laundry detergent before the impact testing.

TABLE II

| Temp. (°C.) | R.H. | dart wt. (g) | height (cm) for rupture |
|---|---|---|---|
| 4.4 | 20% | 55 | 20.32 |
| 4.4 | 35% | 55 | 20.32 |
| 23.9 | 50% | >315 | 38.10 |
| 32.2 | 85% | >454 | 38.10 |
| 37.8 | 70% | >245 | 38.10 |

As illustrated by the data of Table II, above, the inventive films were more resistant to impact after having been exposed to detergent than without such exposure at low temperatures and R.H. and generally retain impact resistance after detergent exposure over a very wide range of temperature and relative humidity conditions. By contrast, comparison polyvinyl alcohol films exposed to detergent for 12 days were ruptured at 4.4° C. (and R.H. of 20%) by the 55 gram dart's falling from a height of only about 2.54 cm. It is believed that this may be due to plasticizer migration from the comparison film into the detergent.

The tensile strength and percent elongation of the Example I embodiment were also determined based on an American Standards Testing Materials method at a two inch per minute crosshead speed, with 35% R.H. and 21.1° C., and were found to have substantially improved tensile strength and elongation properties with respect to comparison polyvinyl alcohol films. Table III, below, illustrates the data of two different embodiments of the invention and of a comparison film (including plasticizer but no rubber component), all of which were tested for tensile strength and elongation.

TABLE III

| | Tensile at Failure (p.s.i.) | Elongation (%) |
|---|---|---|
| inventive film (a)* | 4500 | 640 |
| inventive film (b)** | 4300 | 700 |
| comparison film*** | 2300 | 650 |

*85 wt. % polyvinyl alcohol component, 10 wt. % rubber component, 5 wt. % sorbitol, 3.2 mil thickness
**76 wt. % polyvinyl alcohol component, 10 wt. % rubber component, 10 wt. % sorbitol, 4 wt. % wetting agent (Triton X 114), 2.4 mil thickness
***78 wt. % polyvinyl alcohol, 8.8 wt. % sorbitol, 6 wt. % trimethylopropane, 6 wt. % glycerin, 1 wt. % wetting agent (Triton X 114), 2.5 mil thickness As can be seen from the Table III data, above, a comparison polyvinyl alcohol film tested at the same temperature and relative humidity conditions had significantly less tensile strength and about the same percent elongation properties as the inventive film embodiments.

Samples of the Example I embodiment were also studied for time to disperse and to dissolve by testing in a standard laundry solution (including Borate) at 21.1° C. The films broke up and completely dissolved in less than 30 seconds.

While the invention has been described in connection with specific embodiments thereof, it will be understood that it is capable of further modification, and this application is intended to cover any variations, uses or adaptations of the invention following, in general, the principles of the invention and including such departures from the disclosure as come within the known or customary practice in the art to which the invention pertains and as may be applied to the essential features hereinbefore set forth, and as fall within the scope of the invention and the limits of the appended claims.

What is claimed:

1. A sealed envelope comprising:
a self-supporting film, formed by a polymeric matrix comprising at least about 50 wt. % polyvinyl alcohol, and containing a plurality of microdomains dispersed therethroughout, the plurality of microdomains consisting essentially of a rubbery material which is at least partially incompatible with the polyvinyl alcohol and has a glass transition temperature of less than about 0° C., the microdomains being at least about 3 wt. % of the film.

2. The envelope as in claim 1 wherein the polyvinyl alcohol of the polymeric matrix is in a weight ratio with respect to the plurality of microdomains of between about 32:1 to about 2.3:1.

3. The envelope as in claim 1 wherein the polyvinyl alcohol of the polymeric matrix is in a weight ratio with respect to the plurality of microdomains of between about 19:1 to about 6:1.

4. The envelope as in claim 1 wherein the microdomains are from about 5 wt. % to about 15 wt. % of the film.

5. The envelope as in claim 1 wherein substantially all of the microdomains are less than about 10 microns in size.

6. The envelope as in claim 5 wherein at least most of the microdomains are from about 0.5 micron to about 2 micron in size.

7. The envelope as in claim 3 wherein the rubbery material of the microdomains has a glass transition temperature of about −18° C. or less 8. The envelope as in claim 3 wherein the rubbery material of the microdomains is acrylate, styrene-butadiene co-polymer, neoprene or isoprene.

9. The envelope as in claim 1 further comprising a liquid detergent within the film and contained thereby.

10. The envelope as in claim 9 wherein the liquid detergent has substantially no free water.

11. The envelope as in claim 10 wherein the film is dispersible in water.

12. An article useful for treating fabrics comprising:
a flexible pouch, the pouch being resistant to breakage at low temperature and low relative humidity, the pouch formed by a plastic phase and a rubber phase, the plastic phase including polyvinyl alcohol and being in an amout of from about 70 wt. % to about 97 wt. % of the pouch, the rubber phase being at least partially incompatible with the polyvinyl alcohol and having a glass transition temperature at or below about −18° C. and being in an amount of from at least about 3 wt. % to about 30 wt. % of the pouch; and,
a laundering aid disposed within the pouch.

13. The article as in claim 12 wherein:
the polyvinyl alcohol of the plastic phase has a molecular weight of from about 10,000 to about 100,000 and is about 70% to 100% hydrolyzed.

14. The article as in claim 12 wherein:
the rubber phase includes polysiloxane, polyethylene, polyoxyethylene, neoprene, isoprene, natural rubber, acrylate, styrene-butadiene copolymer, polyisobutylene, polypropylene polyvinyl-fluoride, polyvinylidene chloride or mixtures thereof.

15. The article as in claim 13 wherein the rubber phase is a polymer selected from the group consisting of acrylate, styrene-butadiene copolymer, neoprene and isoprene and is in a weight ratio with respect to the polyvinyl alcohol of the plastic phase of from about 19:1 to about 6:1.

16. The article as in claim 15 wherein a wall of the pouch has a thickness of from about 0.05 mm to about 0.5 mm.

17. The article as in claim 16 wherein the pouch is soluble in an aqueous solution.

18. A self-supporting film comprising:
a polymeric matrix, the polymeric matrix including polyvinyl alcohol; and,
a plurality of microdomains dispersed throughout the polymeric matrix and being at least partially incompatible with the polyvinyl alcohol, the microdomains being from about 0.5 to about 10 microns in size, the microdomains having a glass transition temperature of less than about 0° C., the microdomains being at least about 3 wt. % of the film, the polyvinyl alchol of the polymeric matrix being in a weight ratio with respect to the plurality of microdomains of between about 32:1 to about 2.3:1.

19. The film as in claim 18 wherein a thickness thereof is from about 0.05 mm to about 0.5 mm.

* * * * *

UNITED STATES PATENT AND TRADEMARK OFFICE
CERTIFICATE OF CORRECTION

PATENT NO. : 4,608,187

DATED : Aug. 26, 1986

INVENTOR(S) : Chang

It is certified that error appears in the above-identified patent and that said Letters Patent is hereby corrected as shown below:

Column 7, line 3: after "film," insert --the film--.

Signed and Sealed this

Twenty-eighth Day of October, 1986

[SEAL]

Attest:

DONALD J. QUIGG

Attesting Officer

Commissioner of Patents and Trademarks

REEXAMINATION CERTIFICATE (817th)
United States Patent
Chang

[11] B1 4,608,187
[45] Certificate Issued Feb. 9, 1988

[54] RUBBER TOUGHENED POLYVINYL ALCOHOL FILM COMPOSITIONS

[75] Inventor: Daniel M. Chang, Pleasanton, Calif.

[73] Assignee: The Clorox Company, Oakland, Calif.

Reexamination Request:
No. 90/001,289, Jul. 20, 1987

Reexamination Certificate for:
Patent No.: 4,608,187
Issued: Aug. 26, 1986
Appl. No.: 595,980
Filed: Apr. 2, 1984

Certificate of Correction issued Oct. 28, 1986.

[51] Int. Cl.⁴ ............................................. C11D 17/00
[52] U.S. Cl. .................................... 252/90; 252/174; 206/524.7
[58] Field of Search ............... 252/90, 174; 206/524.6, 206/524.7; 525/56

[56] References Cited

U.S. PATENT DOCUMENTS

3,563,244 2/1971 Asaka et al. ..................... 128/287
4,544,698 10/1985 Roullet et al. .................... 524/503

FOREIGN PATENT DOCUMENTS

51-12835 1/1976 Japan .

*Primary Examiner*—Josephine L. Barr

[57] ABSTRACT

Polymer compositions are provided which may be cast as thin, self-supporting films, useful in forming sealed envelopes or pouches containing granulated pulverulent or non-aqueous liquid materials. The cast films comprise a polymeric matrix, having at least about 50 weight percent polyvinyl alcohol, and a plurality of microdomains dispersed throughout the polymeric matrix. The films have good resistance to breakage at low temperatures and low relative humidities.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 3 are cancelled.

Claims 1, 12, 15 and 18 are determined to be patentable as amended.

Claims 4–11, 13, 14, 16, 17 and 19, dependent on an amended claim, are determined to be patentable.

1. A sealed envelope comprising:
a self-supporting film, the film formed by a polymeric matrix comprising at least about 50 wt. % polyvinyl alcohol, and containing a plurality of microdomains dispersed therethroughout, *the polyvinyl alcohol having a molecular weight of from about 10,000 to about 100,000,* the plurality of microdomains consisting essentially of a rubbery material which is at least partially imcompatible with the polyvinyl alcohol and has a glass transition temperature of less than about 0° C., the microdomains being at least about 3 wt. % of the film, *and the polyvinyl alcohol of the polymeric matrix being in a weight ratio with respect to the plurality of microdomains of between about* 19:1 to about 6:1.

12. An article useful for treating fabrics comprising:
a flexible pouch, the pouch being resistant to breakage at low temperature and low relative humidity, the pouch formed by a plastic phase and a rubber phase, the plastic phase including polyvinyl alcohol and being in an amount of from about 70 wt. % to about 97 wt. % of the pouch, the rubber phase being at least partially incompatible with the polyvinyl alcohol and having a glass transition temperature at or below about −18° C. and being in an amount of from at least about 3 wt. % to about 30 wt. % of the pouch, *and the rubber phase being in a weight ratio with respect to the plastic phase of from about 19:1 to about 6:1;* and,
a laundering aid disposed within the pouch.

15. The article as in claim 13 wherein the rubber phase is a polymer selected from the group consisting of acrylate, styrene-butadiene copolymer, neoprene and isoprene [and is in a weight ratio with respect to the polyvinyl alcohol of the plastic phase of from about 19:1 to about 6:1].

18. A self-supporting film comprising:
a polymeric matrix, the polymeric matrix including polyvinyl alcohol *having a molecular weight between about 10,000 and about 100,000;* and,
a plurality of microdomains dispersed throughout the polymeric matrix and being at least partially incompatible with the polyvinyl alcohol, the microdomains being from about 0.5 to about 10 microns in size, the microdomains having a glass transition temperature of less than about 0° C., the microdomains being at least about 3 wt. % of the film, the polyvinyl alcohol of the polymeric matrix being in a weight ratio with respect to the plurality of microdomains of between about [32:1 to about 2.3:1] *19:1 to about 6:1.*

* * * * *